CECIL K. STEDMAN
INVENTOR.

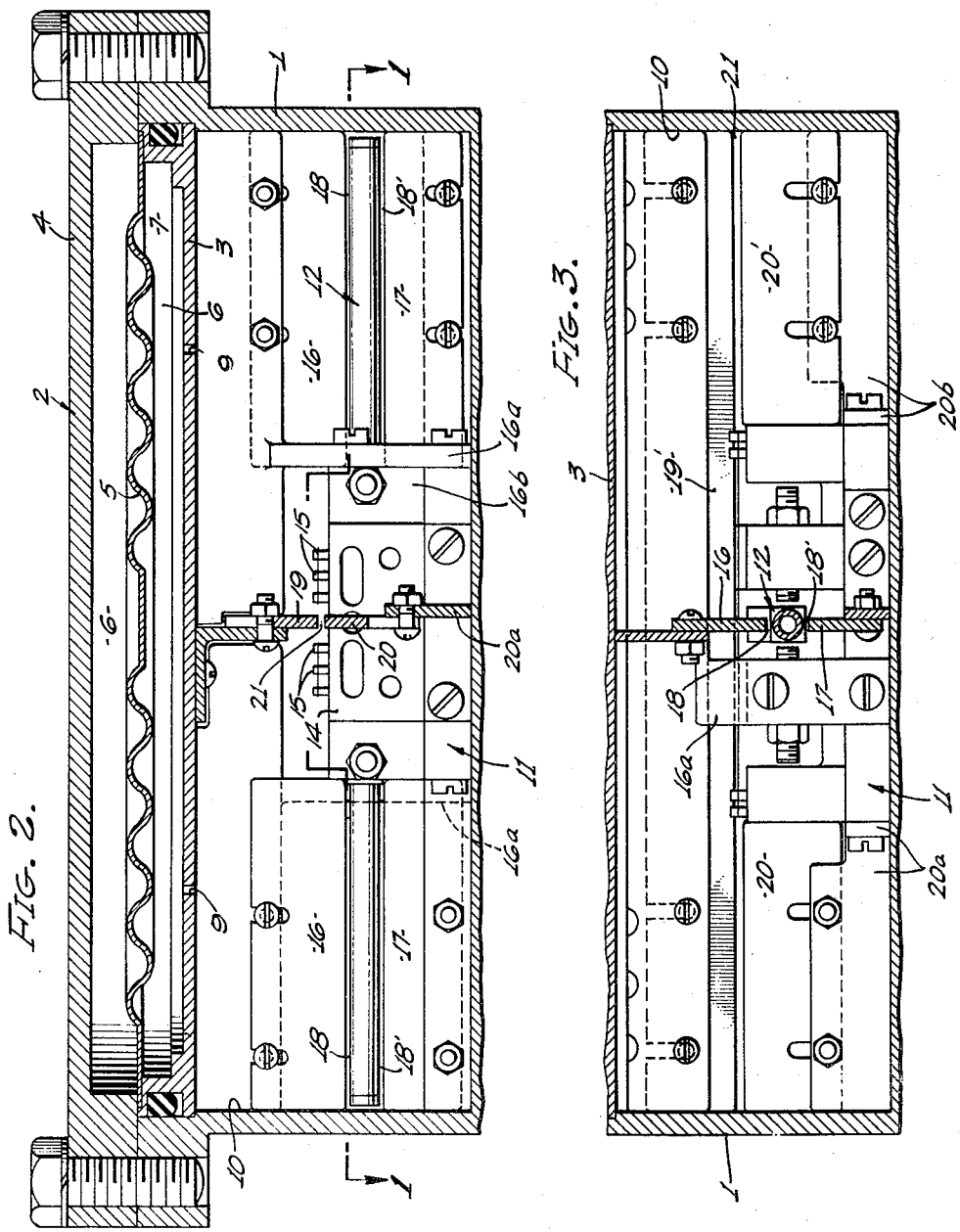

INVENTOR.
CECIL K. STEDMAN
BY Philip Subkow
ATTORNEY

Aug. 23, 1960  C. K. STEDMAN  2,949,782
ANGULAR ACCELEROMETER
Filed Jan. 7, 1957  4 Sheets-Sheet 4

INVENTOR.
CECIL K. STEDMAN
BY
ATTORNEY

United States Patent Office 2,949,782
Patented Aug. 23, 1960

2,949,782
ANGULAR ACCELEROMETER

Cecil K. Stedman, Enumclaw, Wash., assignor to Statham Instruments, Inc., a corporation of California Filed Jan. 7, 1957, Ser. No. 632,812

11 Claims. (73—516)

This invention relates to a motion responsive device for indicating and recording the magnitude and nature of motions of an object in space. It belongs to the general class of motion sensing devices such as accelerometers.

The conventional examples of such systems include devices in which the effective inertial mass is a solid mass suspended on springs and the nature and magnitude of the displacement of the mass on the springs are a measure of the magnitude and nature of the motion.

Instead of using a solid mass suspended on springs, as in the prior art, I employ a liquid mass as the effective inertial mass and measure the acceleration of the liquid mass in the container subjected to the motion to be sensed.

In applications of Louis D. Statham, Serial No. 241,539, filed August 13, 1951, Serial No. 328,416, filed December 29, 1952, Serial No. 431,764, filed May 24, 1954, and in my co-pending application Serial No. 577,707 filed April 12, 1956, of which this application is a continuation-in-part, are disclosed such devices where liquid mass is used instead of a solid inertial mass, and thus one may use a large mass without introducing a large hinge, such as would be necessary were one to use a solid mass of equivalent weight. Such a large weight would require a large hinge or pivots or springs in order to withstand mechanical shocks. Because, as stated above, one uses as the effective inertial mass, a liquid mass, and does not employ a solid mass as the effective inertial mass, one may avoid the use of hinges and pivots of the size necessary where the effective inertial mass is solid rather than liquid.

By placing a movable member immersed in the liquid and mounted for motion relative to the liquid in the container, the relative motion of the liquid and the container wall will cause the movable member to be displaced, as a result of a difference in pressure on both sides of the movable member. By mounting the member so that it is movable relative to the container body, the acceleration of the liquid will produce a thrust on the movable member.

The motion of the liquid is damped by viscous drag. In order to increase the damping effect, there is added an additional damping means, by causing the fluid to flow through an orifice. The result of this arrangement not only gives an additional damping effect but has the property that it tends to maintain a more nearly constant damping coefficient for the instrument, notwithstanding temperature changes and consequent changes in viscosity of the liquid, than would be obtained if the orifice were not employed.

In the instant invention the liquid mass serves as the rotor so that the weight of the paddle which must be supported along the sensitive axis can be made extremely low. Baffles are fixedly mounted above and below the paddle, such baffles being disposed parallel to the axis of the paddle and spaced closely adjacent thereto. Thus, the separation between the edges of the paddle and the inner chamber walls form fluid communication passageways, and the spaces between the baffles and paddles form other fluid communicating passages. When the instrument is subjected to an angular acceleration, the inertial forces will cause the liquid to circulate and develop a pressure against the paddle. The paddle will deflect angularly until the elastic restraint of the flexure and the pickoff (mechanism for sensing the motion) balances the forces on the paddle. The novel structure of the invention can be readily adapted to the use of a variety of pickoff mechanisms.

It is not necessary for the paddle to have any substantial mass; all that is required is that it be structurally rigid. The buoyancy of the paddle reduces the weight of the paddle in the liquid. Preferably and ideally, the weight of the paddle in air may be made equal to the weight of the liquid displaced by the paddle when it is mounted in the device where it is immersed in the liquid forming the effective inertial mass. Such a paddle may be termed buoyant, i.e., having substantially no effective mass when immersed in said liquid. Accordingly, the paddle is preferably constructed as a hollow member with sealed ends so that its weight, when immersed in the liquid, is relatively small, and ideally may be made substantially equal to zero. The use of a buoyant paddle also eliminates the necessity for careful balance of the suspended mass to minimize the sensitivity of the instrument to linear accelerations and angular velocity.

In the devices described and illustrated in the drawings of the previously mentioned specifications, the paddles and baffles separate the chamber into two subchambers which are in fluid communication with each other through the orifices formed by the spaces between the paddle and the baffle edges.

On clockwise angular acceleration of the chamber a counter-clockwise circulation occurs in each of the subchambers, the liquid flowing in opposite directions at the opposite sides of the baffle. A circulation also occurs through the orifices on one side of the chamber and in the opposite direction on the other side of the chamber, i.e., through the paddle orifices between the paddle and baffles and between the paddle ends and the chamber wall. The flow through the gaps may thus be described as in parallel with the flow in each subchamber.

It has been previously observed that the damping ratio, i.e., the fraction of critical damping in such a structure in which the inertial fluid is a liquid whose viscosity changes with temperature, also varies with the temperature.

The damping characteristics of such instruments are such that as the viscosity of the inertial liquid decreases, the damping ratio decreases, passes through a minimum, and then again increases, as the viscosity changes. This minimum usually extends over a range of viscosity wherein the value of the damping ratio changes but in an unappreciable amount. For convenience, this damping ratio may be termed the minimum damping ratio, and viscosity at the minimum value of the damping ratio, the minimum viscosity.

It has been observed that for any given instrument the value of the minimum damping ratio depends on the resistance to flow of the liquid through the orifices and also on resistance to flow in the subchambers, and is approximately equal to the following ratio:

$$\frac{1}{\left(\frac{r}{R}+1\right)^{1/2}} \quad \text{(Eq. 1)}$$

where $r$ is the resistance to flow through the paddle gaps, and $R$ is the resistance to flow in the subchambers.

The true range of the instrument may be defined as the value of the angular acceleration which will give a chosen value of the angular displacement of the paddle relative to the case.

The value of the true range is referred to zero frequency and is valid for all frequencies where the ratio of angular displacement of the paddle to the displacement of the paddle at zero frequency is substantially constant when the same acceleration is given to the instrument at the various frequencies. This chosen angular displacement of the paddle is dependent on the maximum displacement permitted by the transducer chosen. If an electrical resistance strain wire transducer is employed, it is the angular displacement which will strain the wire to the maximum permissible strain. Usually for strain wires commercially employed, this maximum strain is about 0.0015 inch per inch.

This invention relates to a modification of the accelerometers described above whereby the true range of the instrument is increased, i.e., it will require higher values of acceleration to cause a like value of the relative angular displacement of the case and paddle than for a like instrument not employing this modification. I have also observed that contrary to what would be expected from a change which increases the true range of an accelerometer, the natural frequency of the device is decreased. I have thus discovered a means for adjusting the frequency in a manner which is independent of the effective inertial mass which determines the true range. Another effect produced by my invention is that the damping ratio is also materially increased.

This I have accomplished by subdividing the sub-chambers into a plurality of sub-chambers, i.e., more than two in number and preferably at least four in number symmetrically placed on each side of the paddle. The inertial mass circulating in each sub-chamber is reduced. This I have accomplished by introducing additional separating walls or baffles which extend radially of the chamber and in planes transverse to the extension of the paddle baffles.

These and other objects of my invention will be further described in connection with the drawings, of which:

Fig. 2 is an irregular vertical section taken on line 2—2 of Fig. 1;

Fig. 3 is a section taken on line 3—3 of Fig. 1;

Figure 1:
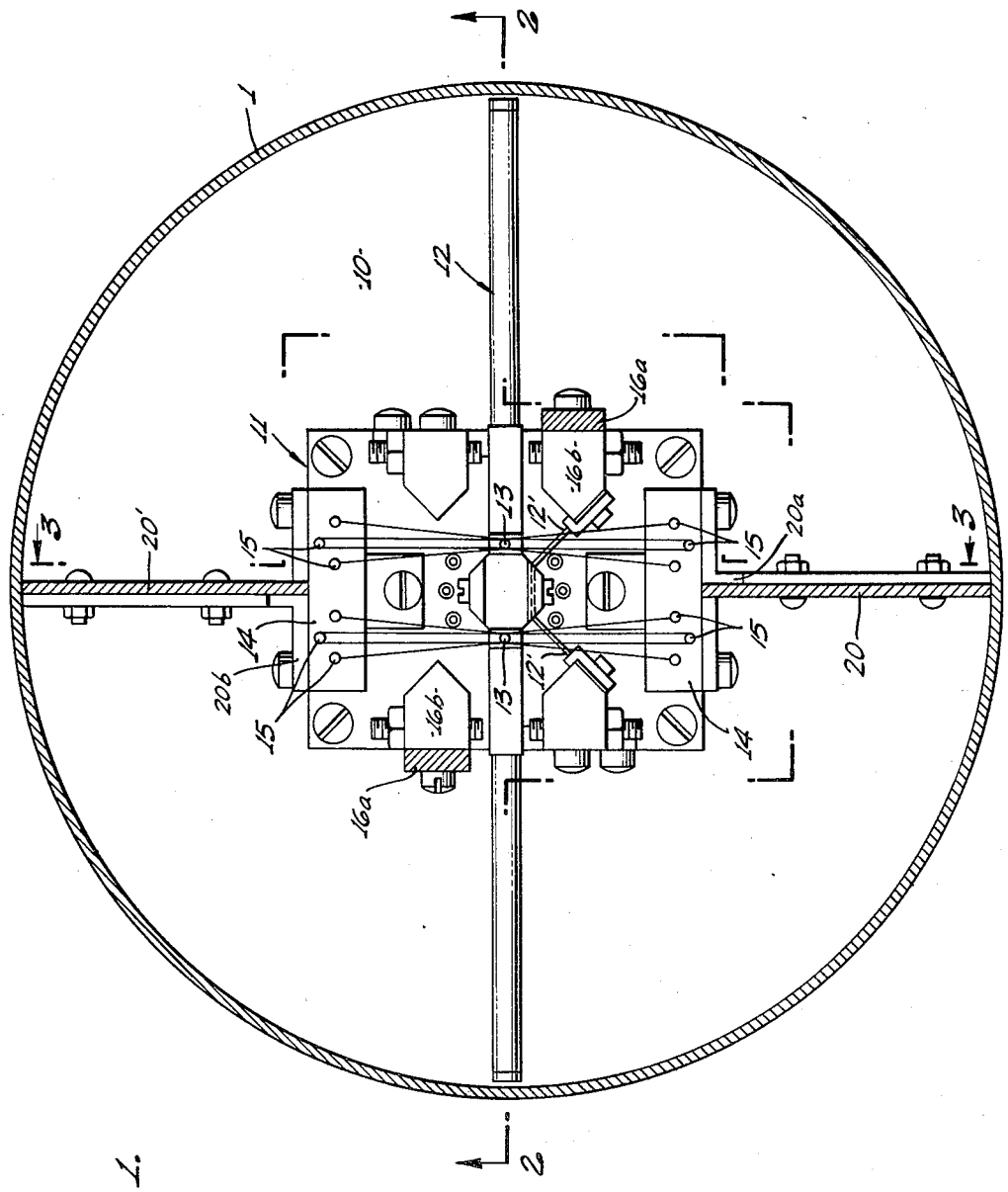
Fig. 1 is an irregular horizontal section of my device taken on line 1—1 of Fig. 2.
Figure 4:
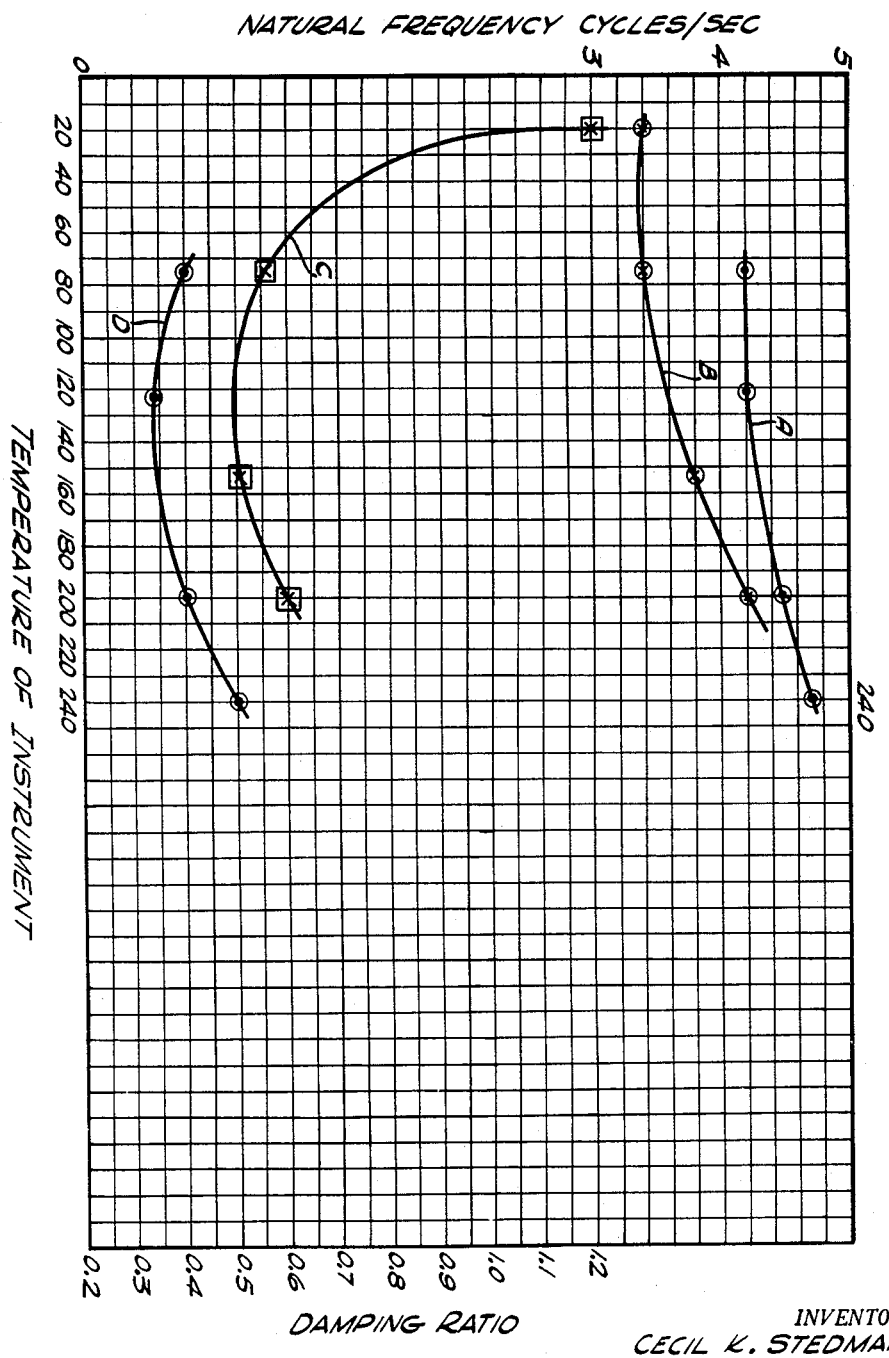
Fig. 4 is a chart showing the effect produced by my invention.

The device shown in Figs. 1 to 3 is substantially identical with the device described in my co-pending application Serial No. 577,707, except for the omission of the auxiliary baffle orifices shown in said co-pending case, which may also be used here for like purposes and the provision in this device of this application of the auxiliary chamber partitions, as will be more fully described below.

The device employs a case 1 in which is carried an expansion chamber 2 sealed by a bottom 3 and a cover 4 and separated by a flexible diaphragm 5 into an air chamber 6 open to ambient pressure and a chamber 7 communicating with the accelerometer chamber 10 via ports 9. The accelerometer chamber 10 (see Fig. 1) formed by the case 1 is shown as circular but may be of any desired cross-section.

Centrally positioned in the chamber 10 is an island 11 on which is mounted a paddle 12 on a Cardan spring suspension 12' so that the paddle is symmetrical about its center and is statically balanced on the spring suspension. The paddle carries insulating pins 13 and the blocks 14 mounted on island 11 carry insulating pins 15. Unbonded electrical resistance strain wires are stretched between 13 and 15 on each side of the center thereof. Across the diameter of the chamber 10 vertically adjustable baffles 16 and 17 are mounted so that the desired spacing 18 may be provided between the paddle and the baffle. The paddle ends are positioned closely adjacent to but are spaced from the wall of the chamber.

The modification which forms the subject matter of my invention and makes possible the adjustment of the range and the damping ratio of the aforementioned structure without any other substantial alteration in the design or other parameters of the instrument is the provision of a pair of baffles extending diametrically across the chamber 10 and directed transversely to the extension of the baffles 16 and 17.

This is illustrated by the baffles 19 and 20 positioned on a diameter 90° to the extension of the paddle baffles. The angle may be other than 90° and more than one pair of such baffles may be used extending diametrically at various angles to the baffles 16 and 17.

Baffle 19 is connected to the cover plate 3 and extends diametrically to the wall of chamber 1. The baffle 20 mounted on bracket 20a extends from the island 11 to the wall, and the baffle 20' mounted on bracket 20b extends in like manner to the diametrically opposed portion of the wall of the chamber 1. The space 21 between the paddles may be adjusted to any desired opening or entirely closed. The paddle baffle 16 is composed of two adjustable sections, the upper section extending from the baffle 19 to the wall of chamber 10 and the vertically adjustable section is mounted on bracket 16a positioned in stop screw block 16b. The baffle 16 extends from the island to the wall. The lower paddle baffle 17 is composed of a vertically adjustable section and a lower section mounted in the base of the chamber 10 and extending from the island to the wall. The spaces between the baffles and the paddle 12 may thus be adjusted. The baffles 19, 20 and 20' may also be vertically adjusted to give any desired spacing, as shown, or the space may be closed, the baffles 19, 20 and 20' abutting.

On angular displacement of the case, there is an angular displacement of the paddle relative to the case due to the inertial effects of the liquid. The inertial effect of the paddle may be reduced or cancelled out due to the buoyancy of the paddle which may be made hollow for such purposes. The angular displacement of the paddle relative to the case results in a variation in strain in the electrical resistance strain wires of the unbonded strain wire transducer attached to the paddle and the degree of angular displacement is reported by the voltage unbalance of the Wheatstone bridge in which the four wire systems are connected. The following data is an example of the effect produced by my invention and is to be taken as illustrative of and not as a limitation of my invention.

Two instruments of the same construction were subjected to test, one of the instruments having the baffles 19, 20 and 20', as shown in the drawings and described in this application. The gap between 19 and 20 and between 19 and 20' was 0.020 inch. The gaps between the paddle and the paddle baffles were 0.094 inch. This is called instrument No. 2. The other instrument was of the same construction in all respects except that the baffles 19, 20 and 20' were omitted. This is called instrument No. 1. The same oil was used, i.e., one having a viscosity of 350 centistokes at 75° F.

The instruments were tested at various temperatures and the results obtained are plotted in the chart figure and in the following table:

Table 1

| Temp. of— | Natural Frequency | | Damping Ratio | |
|---|---|---|---|---|
| | Inst. #1 | Inst. #2 | Inst. #1 | Inst. #2 |
| 240 | 4.7 | | .5 | |
| 200 | 4.5 | 4.2 | .4 | .6 |
| 153 | | 3.8 | | .5 |
| 122 | 4.2 | | .33 | |
| 75 | 4.2 | 3.4 | .4 | .55 |
| 20 | | 3.4 | | 1.2 |

It will be observed that the viscosity of the oil varied with the temperature and the chart figure compares the results obtained with instrument No. 1 and No. 2 at the same temperature when the oil had the same viscosity.

Curve A gives the variation with temperature of the natural frequency of the instrument without the 90° baffles (instrument #1) and curve B gives the variation with temperature of the natural frequency of the instrument with the 90° baffles (instrument #2) at various temperatures. Curve C gives the variation of the damping ratio with temperature of instrument #2 and curve D that of instrument #1.

Comparing these two instruments, it will be seen that the introduction of the baffles has caused at each temperature and oil viscosity a substantial decrease of the natural frequency and a substantial increase of the damping ratio without any substantial displacement of the position of the minimum damping.

The true range of instrument #1 was measured as 1.652 radians per second squared compared with 2.905 rad./sec.$^2$ for instrument #2. The introduction of the 90° baffles increased the true range by 176%.

Figure 5:
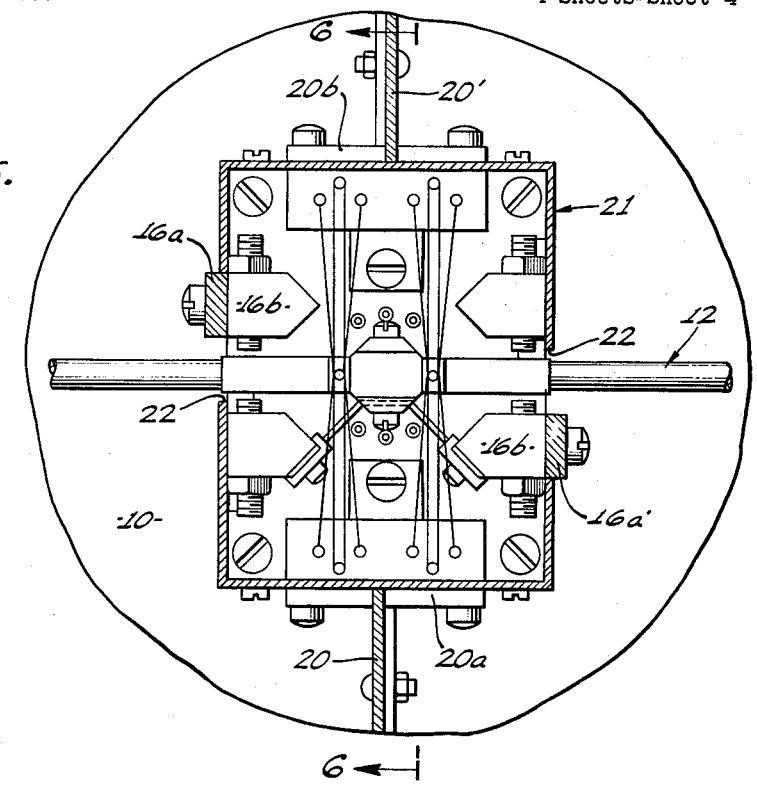
Fig. 5 is a fragmentary section similar to Fig. 1 of a modification of my invention.
Figure 6:
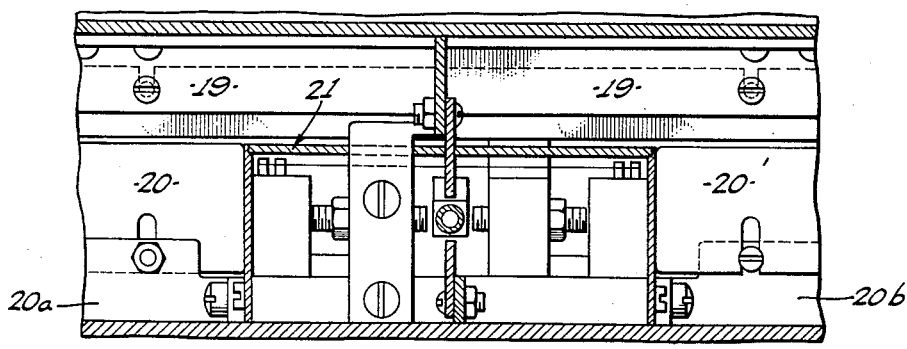
Fig. 6 is a fragmentary section taken on line 6—6 of Fig. 5.

If it is desired to further isolate the oil in each of the subchambers to prevent circulation over the island, I may enclose the island by means of a box cover 21, as shown in Figs. 5 and 6, which sits on the base and is connected to the island. Suitable slots 22 are provided for the brackets 16a and the paddle 12 and the baffles 16 and 17. The top of the box fits underneath the stationary portions of the adjustable sections of the baffles 19 and 16.

While I have described a particular embodiment of my invention for the purpose of illustration, it should be understood that various modifications and adaptations thereof may be made within the spirit of the invention as set forth in the appended claims.

I claim:

1. A motion sensing device, comprising a case, a closed chamber in said case, a liquid inertial mass in said chamber, a paddle in said chamber immersed in said liquid, said paddle being of substantially no effective mass when immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, said paddle being positioned on said mounting for limited angular motion on said mounting with respect to said case on acceleration of said case, said mounting restraining motion of said paddle with respect to said case in the absence of acceleration of said case, a baffle positioned in said chamber extending along said paddle and spaced therefrom, the space between said baffle and said paddle forming a fluid communicating passageway in said chamber from one side of said paddle to the other side, a wall in said chamber extending across said chamber transversely of said baffle and independent of said baffle and dividing said chamber into a plurality of subchambers, and means for sensing said motion.

2. A motion sensing device, comprising a case, a closed chamber in said case, a liquid inertial mass in said chamber, a paddle in said chamber immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, said paddle being positioned on said mounting for limited angular motion on said mounting with respect to said case on acceleration of said case, said mounting restraining motion of said paddle with respect to said case in the absence of acceleration of said case, a baffle positioned in said chamber extending along said paddle and spaced therefrom, the space between said baffle and said paddle forming a fluid communicating passageway in said chamber from one side of said paddle to the other side, a wall in said chamber extending across said chamber transversely of said baffle and independent of said baffle and dividing said chamber into a plurality of subchambers, and means for sensing said motion.

3. In the device of claim 2, said transverse wall extending at substantially 90° to said baffle.

4. A motion sensing device, comprising a case, a closed chamber in said case, said chamber being in the form of a cylinder and having opposing cylindrical wall portions, a liquid inertial mass in said chamber, a paddle of substantially no effective mass when immersed in said liquid, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall portion to the opposing wall and immersed in said liquid, opposing edges of said paddle being adjacent the opposing cylindrical wall portions, an edge of each side of the paddle being spaced from the adjacent wall of the chamber, a baffle positioned in said chamber parallel to said paddle and spaced therefrom, a motion sensing device connected to said paddle to sense the angular displacement of said paddle, and a wall in said chamber extending across said chamber transversely of said baffle and independent of said baffle and dividing said chamber into a plurality of subchambers.

5. In the device of claim 4, said transverse wall extending at substantially 90° to said baffle.

6. A motion sensing device, comprising a case, a closed chamber in said case, said chamber being in the form of a cylinder and having opposing cylindrical wall portions, a liquid inertial mass in said chamber, a paddle, said liquid being the inertial mass and the effective rotor of said device, a spring hinge for said paddle, said spring hinge being connected to said paddle, a mounting in said chamber for said hinge, said mounting being connected to said case and to said hinge, said paddle being rotatably mounted about said spring hinge on the axis of said cylinder for limited angular motion of said paddle about the said axis and with respect to said case on angular acceleration of said case, said hinge restraining motion of said paddle with respect to said case in the absence of angular acceleration of said case about said axis, said paddle extending from one wall portion to the opposing wall and immersed in said liquid, opposing edges of said paddle being adjacent the opposing cylindrical wall portions, an edge of each side of the paddle being spaced from the adjacent wall of the chamber, a baffle positioned in said chamber parallel to said paddle and spaced therefrom, and a motion sensing device connected to said paddle to sense the angular displacement of said paddle, and a wall in said chamber extending across said chamber transversely of said baffle and independent of said baffle and dividing said chamber into a plurality of subchambers.

7. A motion sensing device, comprising a case, a closed chamber in said case, a liquid inertial mass in said chamber, a paddle in said chamber immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, a baffle positioned in said chamber extending along said paddle and spaced therefrom, a liquid communication passageway for fluid movement from one side of said paddle to the other side of said paddle and between the edge of said paddle and said wall and between said paddle and said baffle, said paddle being positioned on said mounting for limited angular motion on said mounting with respect to said case on angular acceleration of said case, said mounting restraining motion of said paddle with respect to said case in the absence of angular acceleration of said case, means for sensing said motion, and a wall in said chamber extending across said chamber transversely of said baffle and independent of said baffle and dividing said chamber into a plurality of subchambers.

8. In the device of claim 7, said transverse wall extending at substantially 90° to said baffle.

9. A motion sensing device comprising a case, a closed chamber in said case, said chamber being in the form of a cylinder and having opposing cylindrical wall portions, a liquid inertial mass in said chamber, a paddle in said chamber and immersed in said liquid, said liquid being the inertial mass and the effective rotor of said device, a hinge for said paddle, said hinge being connected to said paddle, a mounting for said hinge in said chamber, said mounting being connected to said case and to said hinge, said paddle being rotatably mounted about said hinge on the axis of said cylinder, for limited angular motion of said paddle about said axis and with respect to said case on angular acceleration of said case about said axis, said paddle extending from one wall portion to the opposing wall, opposing edges of said paddle being adjacent the opposing cylindrical wall portions, an edge of each side of the paddle being spaced from the adjacent wall of the case, a baffle positioned in said chamber parallel to said paddle and spaced therefrom, said hinge restraining motion of said paddle with respect to said case in the absence of angular acceleration of said case about said axis, a motion sensing device connected to said paddle to sense the angular displacement of said paddle with respect to said case, and a wall in said chamber extending across said chamber transversely of said baffle and independent of said baffle and dividing said chamber into a plurality of subchambers.

10. A motion sensing device, comprising a case, a closed chamber in said case, a liquid inertial mass in said chamber, a paddle in said chamber immersed in said liquid, said liquid being the inertial mass and the effective rotor of said device, a mounting for said paddle fixedly mounted in said chamber and connected to said case, said paddle being movably mounted in said chamber with one edge of said paddle adjacent, but out of contact with, an enclosing wall of said chamber, said panel being positioned on said mounting for limited angular motion on said mounting with respect to said case on acceleration of said case, said mounting restraining motion of said paddle with respect to said case in the absence of acceleration of said case, a baffle positioned in said chamber extending along said paddle and spaced therefrom, the space between said baffle and said paddle forming a fluid communicating passageway in said chamber from one side of said paddle to the other side, a wall in said chamber extending across said chamber transversely of said baffle and independent of said baffle and dividing said chamber into a plurality of sub-chambers, and an electrical strain wire transducer connected to said paddle for sensing said motion.

11. A motion sensing device, comprising a case, a closed chamber in said case, a liquid inertial mass in said chamber, an elongated member in said chamber immersed in said liquid, means connected to said case and mounting said member for angular motion in said chamber with respect to said case on acceleration of said case, said mounting means restraining angular motion of said paddle with respect to said case in the absence of acceleration of said case, a baffle positioned in said chamber extending along said elongated member and spaced therefrom, the space between said baffle and said member forming a fluid communicating passageway in said chamber from one side of said elongated member to the other side, a wall in said chamber extending across said chamber transversely of said baffle and independent of said baffle and dividing said chamber into a plurality of sub-chambers, and means for sensing said motion.

References Cited in the file of this patent

UNITED STATES PATENTS

| | | |
|---|---|---|
| 2,518,906 | Kocmich | Aug. 15, 1950 |
| 2,759,157 | Wiancko | Aug. 14, 1956 |
| 2,778,624 | Statham | Jan. 22, 1957 |

FOREIGN PATENTS

| | | |
|---|---|---|
| 745,050 | Great Britain | Feb. 22, 1956 |